July 25, 1933.   J. A. McGEORGE   1,919,856
VALVE AND COCK
Filed July 18, 1930
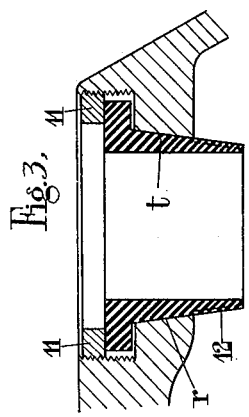
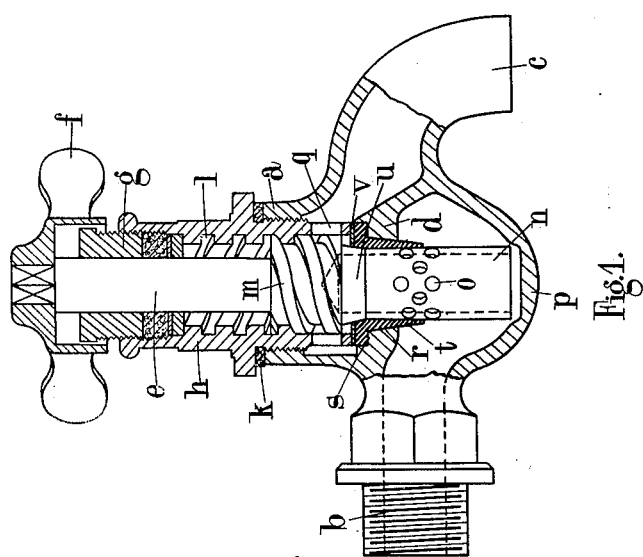
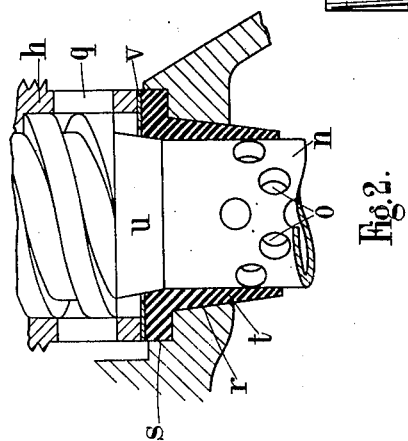
J. A. McGeorge
INVENTOR
By: Marks & Clerk
ATTYS.

Patented July 25, 1933

1,919,856

UNITED STATES PATENT OFFICE

JAMES AUGUST McGEORGE, OF LONDON, ENGLAND

VALVE AND COCK

Application filed July 18, 1930, Serial No. 468,968, and in Great Britain July 24, 1929.

The invention relates to valves and cocks for regulating the flow of liquids and more particularly to that type of valve or bib-cock comprising a piston valve which is adapted to be reciprocated for opening and closing it, such valve moving through a compressible sleeve adapted to be held in engagement with the sides thereof by the conduit pressure, to form a seal, and having openings for the passage of the liquid.

In connection with water supply systems for large blocks of offices, for instance, it may happen that where an in-going main is of relatively small capacity, should a number of taps or valves in the building be open together those in the higher storeys may not get sufficient water, with the result that a vacuum-like condition will be produced in the uppermost parts of the service piping. Directly this occurs, air immediately has a tendency to enter the piping with the result that when the taps are used not only is water hammer caused, but the water when delivered is noisy and intermittent in flow.

The object of the invention is an improved valve of the above type whereby a better shutting off of the valve will be ensured, the arrangement being such that not only will a leakage of water out of the valve be prevented, but any leakage of air through the valve into the piping will also be prevented.

The invention consists in a valve or bib-cock of the type above referred to in which the piston valve is provided with an enlargement adapted to engage with one end of the compressible sleeve so as to form a second seal.

The invention will now be described with reference to the accompanying drawing which illustrates various forms of construction according to the invention.

Figure 1 is a general vertical section of a bib-cock according to the invention, Figure 2 is an enlarged vertical section of the rubber sleeve which is associated with the closing member of the cock, Figure 3 is a detail hereafter referred to.

In carrying the invention into effect as shown in Figures 1 and 2, the bib-cock comprises a body $a$, inlet $b$ and an outlet $c$ divided by the usual partition $d$.

The movable member of the bib-cock comprises a centre stem $e$ adapted to be operated by the usual turning bosses $f$.

The upper end of the stem $e$ is adapted to work to and fro through a packing gland $g$ screwed into the casing $h$, such casing $h$ in its turn being screwed into the body part $a$, fluid tightness being secured by the washer $k$. The interior of the casing $h$ is screw-threaded as at $l$ to engage screw threads $m$ formed on the centre spindle $e$. The lower end of the spindle beneath the threaded portion $m$ comprises a hollow piston valve-like member $n$ provided with a series of perforations $o$ the lower open end of the piston valve $n$ being adapted if desired to make sealing contact at $p$ with the bottom of the body part $a$. The lower end of the casing $h$ is multi-ported at $q$ and as shown these ports $q$ and the lower end of the casing $h$ are positioned above the partition $d$ of the bib-cock casing.

In the partition a seating is provided comprising a wall surrounding a conical opening $r$ forming a continuation of an enlarged socket $s$ and within the socket $s$ and the tapered orifice $r$ there is arranged a correspondingly shaped sleeve $t$ preferably of a suitable yielding or compressible material, such as rubber, the lower end of such sleeve being tapered down to a thin ring as shown and extending below the partition $d$, the interior of the sleeve fitting tightly upon the piston valve member $n$. The general form of the piston valve is cylindrical but towards its upper end where it joins up to the screw threading $m$ there is a tapered or wedge-like portion $u$ which extends outward for a purpose hereinafter described.

In the position illustrated in Figure 1 the piston valve $n$ is shown in its lowermost position, that is, in a sealing position, and upon suitably rotating the centre stem the piston valve will be drawn upwards, the position of the perforations $o$ being such that in the position shown no fluid can pass through the valve. When the valve is raised, the perforations o are caused to move upwards whereby fluid coming from the inlet b may pass up through the interior of the piston valve and will escape through the perforations and out to the outlet c by means of the ports q. Upon now closing the bib-cock the piston valve is moved downward whereby the perforations o come into the position shown in Figure 1 so that the incoming fluid can no longer pass to the outlet c and any leakage is prevented owing to the thin lower end of the rubber sleeve t being tightly pressed by the pressure of the incoming fluid around the piston valve to thereby prevent any flow of fluid up between the valve and the rubber sleeve to the outlet.

This sealing effect of the thin lower end of the sleeve is however very much improved by the coned upper portion u of the piston valve, since when the valve has been screwed down at the conclusion of the downward movement the coned portion u exerts a wedge-like action which seals any minute passage that might be left between the valve and sleeve.

If desired the lower end of the sleeve h and the upper surface of the ring on the end of the rubber sleeve may be separated by a thin metallic or other washer v whereby the upper surface of the rubber ring may present a firm bearing to the lower end of sleeve h, and when such sleeve is screwed down into position it will not tend to exert any dragging effect upon the upper end of the rubber sleeve.

It is to be understood that when the centre stem is screwed upwards no movement of the rubber sleeve occurs but when the downward movement commences, owing to the slightly diminished diameter of the sleeve relatively to the piston valve, a very close grip is obtained between the piston valve and the interior of the sleeve and this grip will be increased by the coned form of the aperture r formed in the partition b. At the conclusion of the downward movement of the piston valve, there is then exerted a second wedging or sealing action upon the rubber sleeve by the cone portion u, thus ensuring an absolutely sealed joint.

Figure 2 shows an enlarged view of the construction of the sleeve.

From the foregoing description it will be understood that a valve constructed according to the invention will provide a two-fold seal obtained against water leaking out when the tap is closed down, and also a two-fold seal against air or water getting in when the tap is closed so that, namely, water cannot pass out and air or water cannot pass in as the case may be, when the valve is closed.

The longitudinal movement of the valve stem need not be obtained by means of a screw, it may alternatively be produced by a hand lever fulcrumed in the top of the valve casing, so that when one end of the lever is depressed, the other end which engages with the spindle will raise the stem bodily to open the valve, the converse movement of the lever closing the valve assisted or not with a spring, the cone acting as before.

In a further modification illustrated in Figure 3, the rubber sleeve t is adapted to be held in position by means of a ring 11 of square section, screwed into a threaded socket in the upper side of the partition d so that if any wear occurs in the rubber sleeve adjustment is provided for. The upper surface of the threaded ring 11 will make contact with the lower end of the casing h as it is screwed down into position.

If necessary the rubber sleeve t may be reinforced by a canvas or other insertion 12 as indicated in dotted lines, or a suitably stiff sleeve may be used to surround the rubber.

The seating in the partition may be extended downwards in order to give more support to the sleeve. The external pressure at the bottom end of the sleeve may fluctuate and sometimes the pressure may be taken off altogether. Therefore a tight-fitting sleeve of ample thickness and good compressibility or resilience would provide the necessary compensation. In other words when there is no pressure available to seal the bottom end of the sleeve, the resilience in the sleeve itself provides the necessary seal.

Having now described my invention, what I claim as new and desire to secure by Letters Patent is:—

1. In a valve for fluids comprising a hollow body having an inflow and an outflow passage and formed with an internal shoulder between said passages, a compressible sleeve supported on said shoulder, a manually controlled perforated hollow piston having a closed end reciprocable in said sleeve, a coned portion on said closed end of the piston, said coned portion being arranged to exert a wedging action on the compressible sleeve to form a seal when the piston is in one of its positions.

2. In a valve for fluids comprising a hollow body having an inflow and an outflow passage and formed with an internal shoulder between said passages, a compressible sleeve supported on said shoulder, a retaining ring to hold the upper end of the sleeve against the shoulder, a manually controlled, perforated hollow piston having a closed end reciprocable in said sleeve, a coned portion on said closed end of the piston, said coned portion being arranged to exert a wedging action on the compressible sleeve to form a seal when the piston is in one of its positions.

JAMES AUGUST McGEORGE.